Dec. 11, 1923. 1,477,336
R. D. FAY ET AL
MEANS FOR ATTACHING FLEXIBLE LABELS TO THE ENDS OF BOARDS
Filed Jan. 14, 1922 5 Sheets-Sheet 2

INVENTORS
Richard D. Fay
Frank R. Shaw
BY
ATTORNEYS

Dec. 11, 1923. 1,477,336
R. D. FAY ET AL
MEANS FOR ATTACHING FLEXIBLE LABELS TO THE ENDS OF BOARDS
Filed Jan. 14, 1922   5 Sheets-Sheet 4

INVENTORS
Richard D. Fay
Frank R. Shaw
By
ATTORNEYS

Dec. 11, 1923. 1,477,336
R. D. FAY ET AL
MEANS FOR ATTACHING FLEXIBLE LABELS TO THE ENDS OF BOARDS
Filed Jan. 14, 1922 5 Sheets-Sheet 5
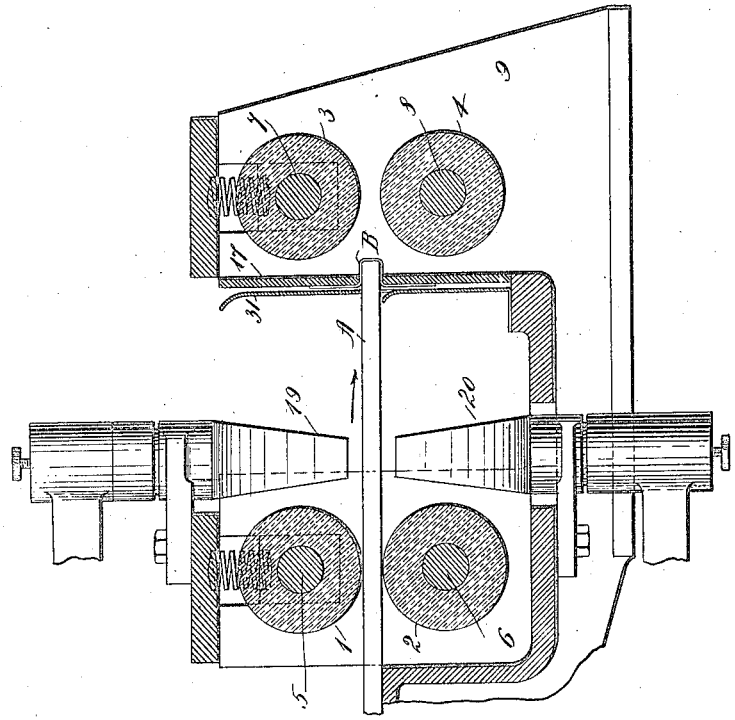
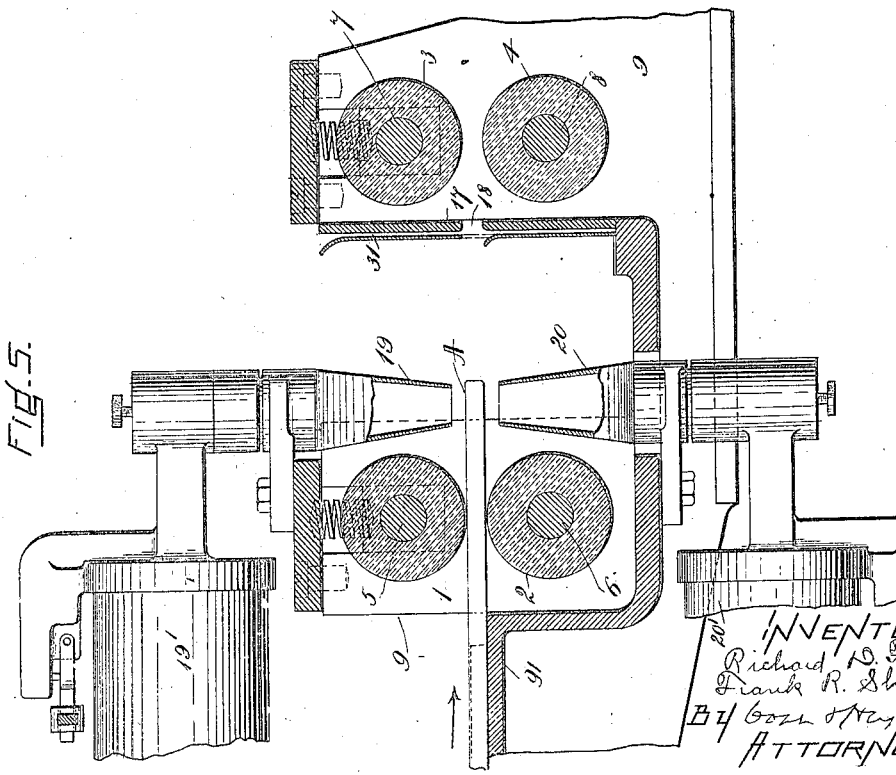

Patented Dec. 11, 1923.

1,477,336

UNITED STATES PATENT OFFICE.

RICHARD D. FAY, OF NAHANT, AND FRANK R. SHAW, OF EAST BRIDGEWATER, MASSACHUSETTS, ASSIGNORS, BY MESNE ASSIGNMENTS, TO HAYES-FAY LABORATORIES, INC., OF BOSTON, MASSACHUSETTS, A CORPORATION OF MASSACHUSETTS.

MEANS FOR ATTACHING FLEXIBLE LABELS TO THE ENDS OF BOARDS.

Application filed January 14, 1922. Serial No. 529,353.

*To all whom it may concern:*

Be it known that we, RICHARD D. FAY, of Nahant, in the county of Essex and State of Massachusetts, and FRANK R. SHAW, of East Bridgewater, in the county of Plymouth and said State, both citizens of the United States, have invented a new and useful Improvement in Means for Attaching Flexible Labels to the Ends of Boards, of which the following is a specification.

A bolt of cloth is usually wound on a piece of board or cardboard, one or both ends of which have been labelled with the manufacturer's name, the brand, etc. or with a blank label to give a finished appearance to the package. The attaching of these labels has heretofore been done by hand, several operators being required in large mills to keep ahead of the production of the looms.

Our invention relates to means whereby such labels may be applied mechanically, and comprises primarily means for attaching a label of suitable shape and character, operable by the feeding of the board or other object to which the label is to be attached.

It will be understood by reference to the drawings in which it is shown in its preferred form.

Figure 1:
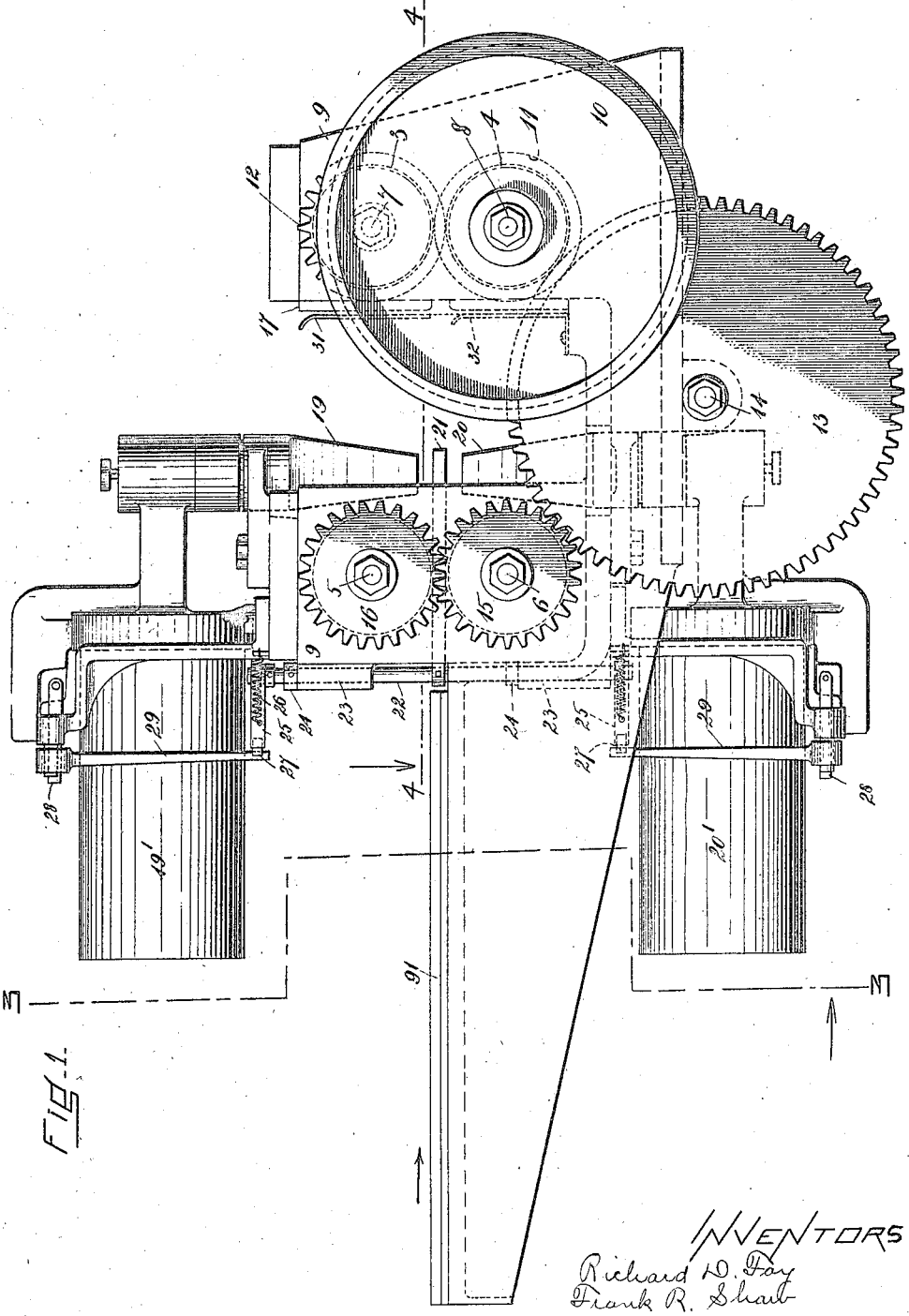
Figure 1 is a side elevation of the machine which we have devised for carrying out the necessary operations.
Figure 3:
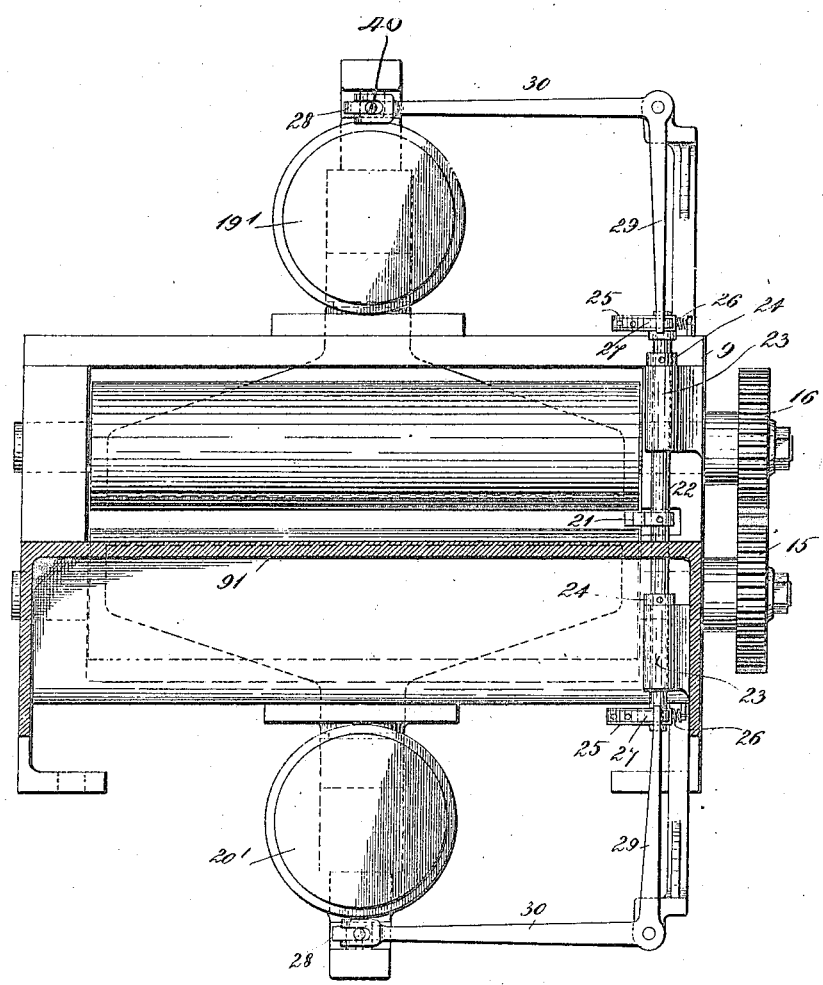
Figure 4:
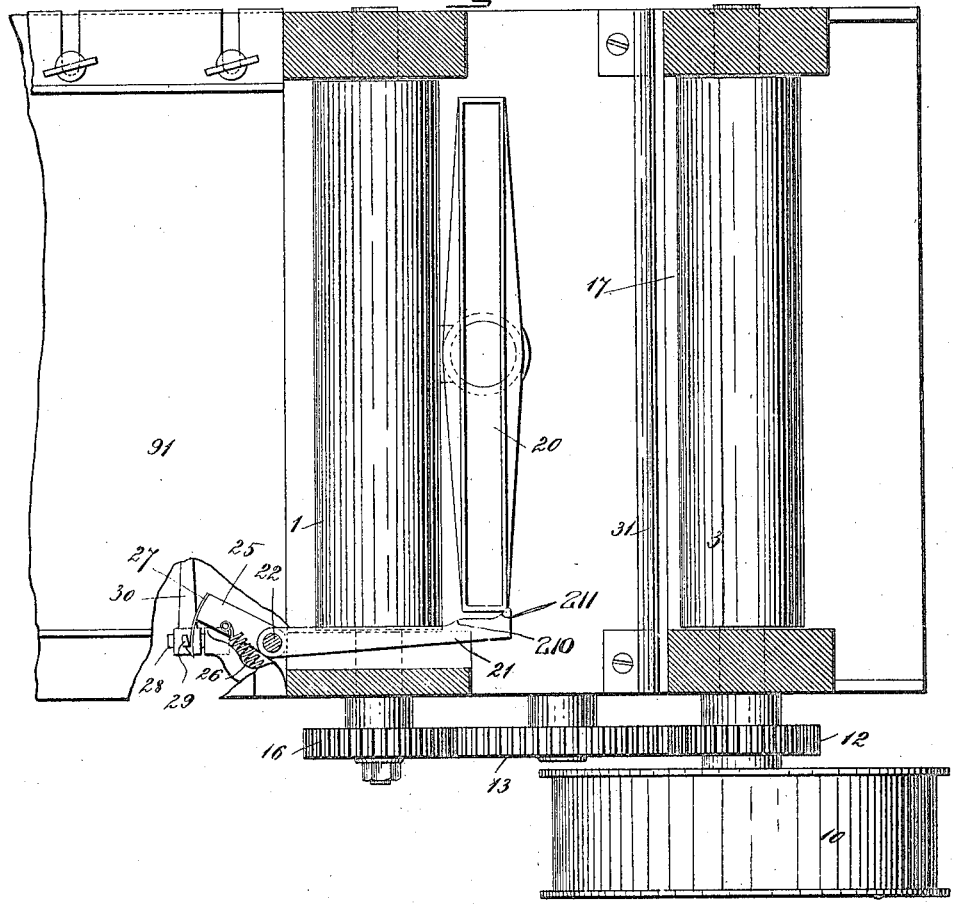

Figs 3 and 4 are sections on lines 3—3 and 4—4 of Fig. 1.

Figure 7:
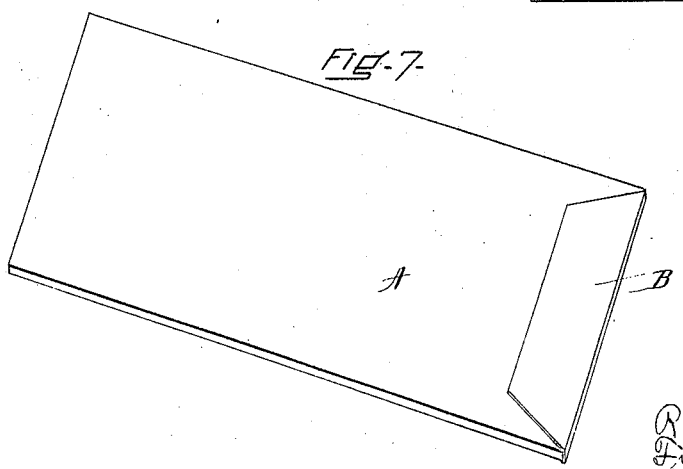

Figs. 5 and 6 are sectional details showing the board in feeding and attaching position, and Fig. 7 shows the labelled board.

A is a cloth-board and B is the label.

The machine as shown consists of two pair of rolls 1, 2 and 3, 4. The shafts 5, 6, 7 and 8 for these rolls are mounted in a frame or base 9, which carries a feed table 91 for the board, the shafts 5 and 7 for the top rolls being mounted in a spring-controlled bearing in a known way so as to yield slightly to any irregularity in the thickness of the board, etc. A pulley 10 is also mounted upon the shaft 8 of roll 4 and is belted to a source of power. On the shaft 8 is also a gear 11 which engages gear 12 on the end of the shaft 7 of roll 3 and lies directly above it. An idler gear 13 mounted on stud 14 projecting from base 9 also engages gear 11 and serves to impart motion from shaft 8 to rolls 1 and 2 through gears 15 and 16 on the shafts 6 and 5 of rolls 2 and 1 so that rotation of pulley 10 rotates the rolls 1, 2, 3 and 4 to feed the board in the direction of the arrow in Figs. 1, 5 and 6.

Interposed between these two pairs of rolls and mounted on the frame 9 is a vertical plate 17 having a slot 18, the horizontal length of which is at least equal to the width of the board or other object to be covered. The vertical width of the slot is slightly greater than the thickness of the board. This slot registers with the feed table 91 so that the board will be fed from the table directly through it.

The nozzles 19 and 20 are located one above the other between rolls 1 and 2 and plate 17. These nozzles are connected with tanks 19' and 20' containing paste, mucilage or similar adhesive substance and are for the purpose of spraying the adhesive substance upon the upper and under surfaces of a portion of the board, being similar in construction to the well known spray guns for coating objects with lacquer or paint by the use of compressed air. Such a gun is shown in Letters Patent No. 1,401,397, dated December 27, 1921. The tanks 19' and 20' are like the tank 1 of that patent and the adaptation of the gun as a whole to the form shown in our drawings will be understood. Nozzle 19 sprays the adhesive material upon the upper surface of the object to be coated, and nozzle 20 performs the same operation upon the lower surface. Each nozzle is provided with a trigger mechanism which when it is operated allows the adhesive material to be atomized by compressed air.

The extent of the surface of the object to be labelled can be controlled by controlling the time during which the trigger is operated with relation to the speed of the travel of the board. Some such arrangement is necessary so that no more of the surface of the board shall be coated with adhesive material than is to be covered by the label. This controlling means comprises a cam-shaped arm 21 which is mounted on vertical shaft 22 and projects somewhat into the path of the object to be coated to be struck by it just after it has passed between rolls 1 and 2 and as it comes between the nozzles. The vertical shaft 22 is mounted to be turned by the arm 21 in bearings 23 attached to the frame 9, collars 24 being provided to hold it in proper position in said bearings. Attached to shaft 22, near each end thereof, are arms 25 to each of which is attached one end of a spiral spring 26, the other end of which is attached to the frame 9. The shaft 22 is thus held normally so that the arm 21 will lie in the path of the work to be labelled. It will be noted that the arm 21 has two projections 210 and 211 which lie in the path of the work as it is fed between the rolls 1 and 2 so that the work first strikes the projection 210 forcing the free end of the arm outward a short distance and giving the shaft 22 and the parts carried by it a small movement. The work later reaches the projection 211 and gives the arm 21 and shaft 22, etc. a further movement.

Spring hooks 27 are fastened onto the end of each arm 25. 29 and 30 are the arms of two bell crank levers the fulcrums of which are the studs 28 supported on the frame 9. Arms 30 of these levers are each connected by a suitable hinged connection 40 with the actuating mechanism of one of the spray guns, so that the movement of the arms 30 controls the operation of the spray guns. The guns are normally inoperative, their triggers being held in closed position by springs within their casing (not shown) as will be understood from the specification and drawings of the above patent. When the trigger of the gun is lifted by the movement of the bell crank levers 29, 30, the guns spray the object in front of the nozzles 19 and 20 until the trigger is released.

In feeding the work between the feed rolls 1 and 2 the work first strikes the cam surface 210 of the arm 21 and thus gives the vertical shaft 22 a slight turn so that the hooks 27 will pull the arms 29 of the bell crank levers sufficiently to operate the spray guns, so that the nozzles 19 and 20 will spray the work with the adhesive material. When the work strikes the cam surface 211 it gives the shaft 22 a further turn so that the spring hooks 27 slide off the end of the arms 29 and the bell crank levers and the spraying mechanism are released and the spraying stopped.

The cam arrangement above described for controlling the time during which the spraying takes place is one of several that can be used for accomplishing the same result. The novelty claimed for this feature of our invention lies in the fact that the operation of the spray guns is controlled by the forward movement of the object to be coated with adhesive material.

Figure 2:
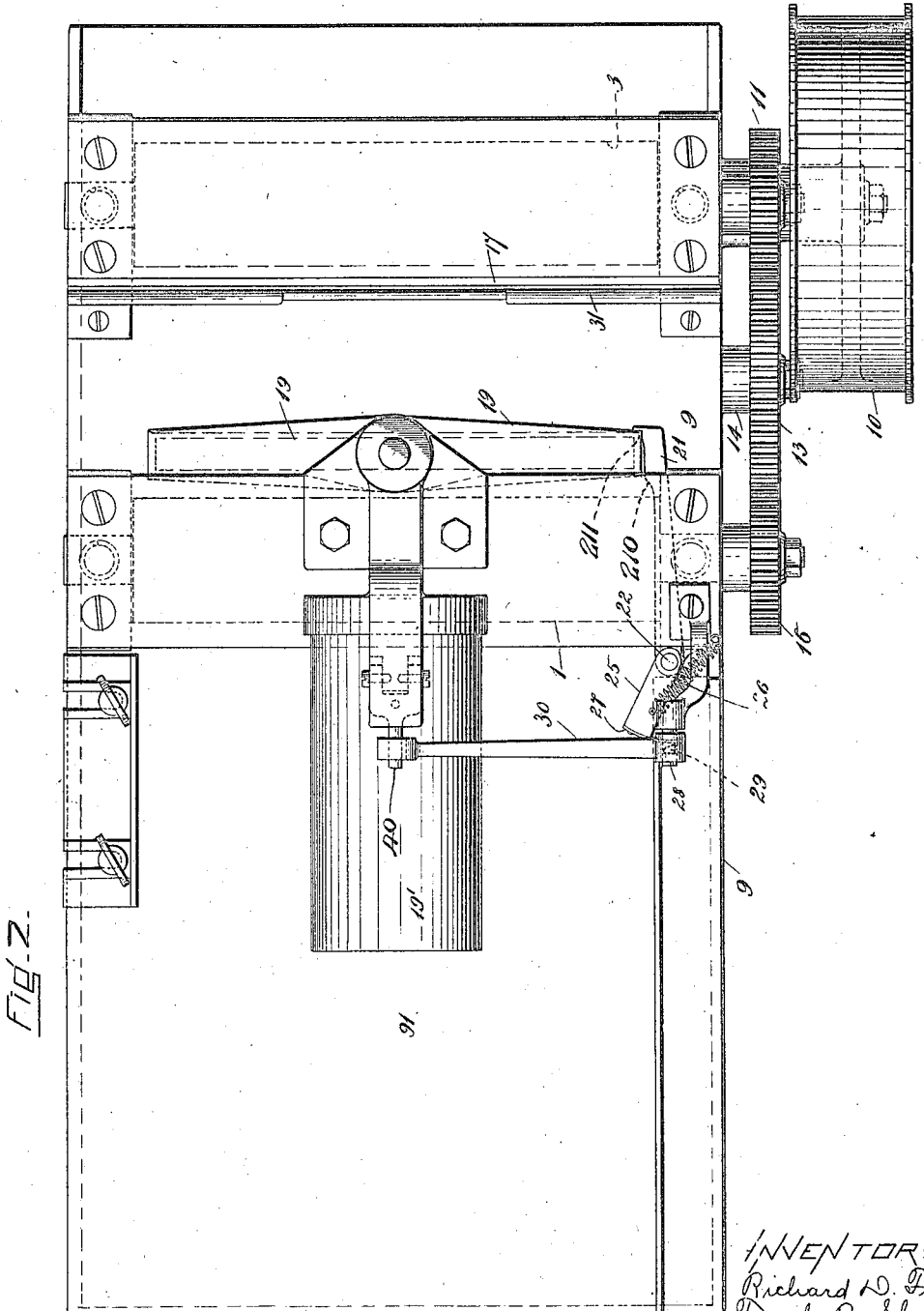
Fig. 2 is a plan thereof.

The manner in which this device operates is as follows: A label of the desired form and size is placed in clips 31 and 32, which are attached to the plate 17. The object upon which a label is to be pasted is laid upon the feed table 91 and pushed by hand or automatically between rolls 1 and 2 which are made to revolve in such a direction as will draw the object toward plate 17. After the entering end of the object has passed through rolls 1 and 2 it strikes the projection 210 of cam arm 21 pushing the cam arm 21 partially out of its way (see Fig. 2). As the object is fed it slides along the surface of the arm until it strikes the projection 211 which pushes the cam arm 21 still further out of the way, thus causing the spring hooks 27 to slide off the arm 29 and release the triggers, thus opening nozzles 19 and 20, permitting the top and bottom of the object to be covered with adhesive material. It will be noted that a slight movement of the arm 21 will turn the shaft carrying the spring-controlled arms 25 to which are attached the spring hooks 27 normally engaging the end of the arms 29. This movement of arm 21 therefore will pull the bell cranks 29, 30 and start the spray guns. A further movement of the arm 21 will snap the spring hooks 27 out of engagement with the arms 29 so that under the influence of springs within the guns they will be forced into their original position and the spring hooks will again engage them (see Figs. 2, 3 and 4). As the object is carried farther by the operation of the rolls 1 and 2 its end comes in contact with the label which is drawn by the object through slot 18 in the plate 17. The object with the label over its end then is forced, by the revolutions of rolls 1 and 2, between rolls 3 and 4, which rolls press the label upon the object and cause the adhesive substance to bind the label firmly and smoothly upon the end, top and bottom of the object. In some cases we have found it desirable to have the peripheral speed of rolls 3 and 4 somewhat less than that of rolls 1 and 2 in order to prevent the label from being drawn off. Our preferred method of accomplishing this is to have rolls 1 and 2 of slightly greater diameter than that of rolls 3 and 4, but the desired result can be obtained by so arranging the gearing that the desired difference in speed can be obtained.

We have not described in detail the construction and means for operating the spray guns as such devices are well known in the art of distributing liquids such as paint, etc.

The feed table on which the board or other object to be labelled is laid and the feed rolls 1 and 2 are desirable features because they direct the board to the slot 18 and into proper engagement with the cam arm 21, but the board may be fed by hand, the important features of the invention being the operation of the nozzles at such time as is desired to spray only a desired portion of the board, means for presenting to the board after it has been properly sprayed with adhesive the label to be attached thereto, and the pressing of the label upon the board. It will be evident to one skilled in the art that these operations may be performed by other instrumentalities than those shown. The size and shape of the clips depend upon the size and shape of the label to be attached, and the opening between the clips, which registers with the slot 18, should conform to the size and shape of the end of the board to be covered.

It may be desired to use the machine for labels of different lengths and hence to be able to adjust the machine to spray different areas of the boards so that the labels may be properly attached thereto. This may be accomplished by substituting for the arm 21 an arm having a cam edge of suitable shape for the desired purpose. If desired the machine may be adjusted to coat only one side of the board.

In using the term "label" we do not mean to confine ourselves to a piece of material having information printed thereon but to include any strip which it may be desired to attach to a board for information, ornamentation, etc., nor do we mean to limit ourselves to a mechanism for attaching the label to the object by paste or gum as other means of attachment which is caused to be operated by the advance or feed of the object to be labelled may be used for the purpose.

What we claim as our invention is:—

1. In a machine of the kind described, a mechanism for coating an article with a liquid, and means for operating said coating mechanism comprising a cam located to be moved by the article to be coated while passing through said coating mechanism, and connections between said cam and said coating mechanism whereby said article on striking said cam will first cause said coating mechanism to become operative and on further movement of said article will cause said coating operation to cease.

2. In a machine of the kind described, a mechanism for coating an article with a liquid, means for operating said coating mechanism located to be operated by said article as it is being fed, and means for stopping the operation of said coating mechanism, also operable by said article, whereby a predetermined portion only of the surface of said article will be coated.

3. A machine of the kind described comprising a spraying means, means located to be engaged by the object to be sprayed whereby it will cause the spraying means to spray a limited portion of said article, and means for supporting a label whereby said label will be engaged by said article as it is fed and be laid on the sprayed surface thereof.

4. A machine of the kind described comprising a spraying means, means located to be engaged by the object to be sprayed whereby it will cause the spraying means to spray a limited portion of said article, and means for supporting a label whereby said label will be engaged by said article as it is fed and be laid on the sprayed surface thereof, and means for pressing said label against said sprayed surface.

5. A machine of the kind described comprising a feed table, spraying mechanism comprising one or more nozzles, a label holder, pressing means, and means located in proximity to said feed table to be engaged by the object fed thereby whereby said spraying nozzles may be rendered operative to spray a portion of said object while it is being fed and again rendered inoperative before said object has left said feed table.

6. In a machine of the kind described, a spraying mechanism comprising one or more nozzles normally closed and adapted to be opened for a predetermined time, and means for opening said nozzles comprising a lever mechanism, a mechanism adapted to engage and release said lever mechanism, and means for operating said lever-operating mechanism comprising a cam arm adapted to be operated by the progressive engagement therewith of the object to be sprayed, whereby the movement of said object will first operate said lever-operating mechanism to cause it to open said nozzles to allow them to spray said object and the progressive further movement of said object will cause said nozzles to be closed.

7. The labelling machine of the kind described comprising feed rolls, a label holder located in front thereof, presser rolls located in front of said label holder, spraying nozzles located to spray different sides of an object while it is being fed, and means operated by said object whereby said nozzles shall be opened during a predetermined portion of the movement of said object.

8. In combination with a mechanism for coating an article with a liquid, a feed table for said article along which it may be moved progressively and a cam lever located to be engaged by said article as it passes over said feed table and having a projection whereby said article will give it a slight movement out of its path, and having a second projection adapted to be engaged thereafter by said article and move said cam still further out of its path, and connections between said cam and said coating mechanism whereby the first movement of said cam will cause said coating operation to begin and said second movement of said cam will cause said coating operation to cease.

9. A machine of the kind described comprising a feed table, a spraying mechanism and means for operating said spraying mechanism located on said feed table in the path of the work to be sprayed and operated by said work and adapted to operate said spraying mechanism to spray a portion only of said work.

10. A machine of the kind described comprising a feed table, a spraying mechanism and means for operating said spraying mechanism located on said feed table in the path of the work to be sprayed and adapted to operate said spraying mechanism to spray a portion only of said work, said spray-operating mechanism comprising a cam lever and connections between said cam lever and said spraying mechanism having projections thereon, one of said projections being adapted to cause the operation of the spraying mechanism to spray the work and the other projection to disengage said connections, whereby said spraying mechanism will be thrown out of operative position.

RICHARD D. FAY.
FRANK R. SHAW.